(12) United States Patent
Ronen et al.

(10) Patent No.: US 7,428,840 B2
(45) Date of Patent: Sep. 30, 2008

(54) APPARATUS FOR MEASURING VOLUMETRIC OR MASS FLUID FLOW

(75) Inventors: Aviram Ronen, Kiryat Motzkin (IL); Yechiel Weinstein, Atzmon (IL)

(73) Assignee: A.L. Hadas Technologies, Ltd. (IL)

( * ) Notice: Subject to any disclaimer, the term of this patent is extended or adjusted under 35 U.S.C. 154(b) by 454 days.

(21) Appl. No.: 11/273,226

(22) Filed: Nov. 12, 2005

(65) Prior Publication Data

US 2006/0075830 A1  Apr. 13, 2006

(30) Foreign Application Priority Data

May 12, 2004  (IL) .................... PCT/IL2004/00407

(51) Int. Cl.
*G01F 3/14* (2006.01)
*A61M 5/00* (2006.01)

(52) U.S. Cl. ........................................ 73/239; 604/254
(58) Field of Classification Search ............ 604/80
See application file for complete search history.

(56) References Cited

U.S. PATENT DOCUMENTS

| | | | | |
|---|---|---|---|---|
| 3,815,424 | A * | 6/1974 | Aegidius | 73/453 |
| 3,989,043 | A * | 11/1976 | Dimeff | 604/254 |
| 4,314,484 | A * | 2/1982 | Bowman | 73/861.41 |
| 5,236,578 | A * | 8/1993 | Oleskow et al. | 73/861 |
| 6,339,959 | B1 * | 1/2002 | Natapov | 73/239 |
| 6,485,454 | B1 * | 11/2002 | Yueh | 604/80 |
| 6,640,649 | B1 * | 11/2003 | Paz et al. | 73/861.41 |

* cited by examiner

*Primary Examiner*—Harshad Patel
(74) *Attorney, Agent, or Firm*—N. Paul Friederichs; Angenehm Law Firm, Ltd.

(57) ABSTRACT

The present invention provides apparatus for measuring volumetric or mass flow of fluid. The apparatus comprises a capsule that is adapted to move upwardly and downwardly within a housing and receive fluid from a tube. The apparatus further comprises force exerting means and preferably a magnetic means that is adapted to exert force on the capsule, the force is proportional to a position of the capsule within the housing. The force is measurable and controllable. A seal is provided in the capsule's bottom opening so as to fluidically block the capsule and a pin is provided so as to push aside the seal when the capsule is downwardly positioned and is filed with fluid so as to drain it. The number of times the capsule is drained in a predetermined time can be calculated so as to attain the volumetric flow rate of the fluid through the apparatus.

26 Claims, 3 Drawing Sheets

APPARATUS FOR MEASURING VOLUMETRIC OR MASS FLUID FLOW

FIELD OF THE INVENTION

The present invention relates to fluid flow measuring systems. More particularly, the present invention relates to apparatus for measuring the volumetric or mass fluid flow, especially when fluid flows in a non-continuous manner, and a method of using the same.

BACKGROUND OF THE INVENTION

Fluid management is important in many fields such as in domestic fields, scientific fields, plants and in the medical field. In the medical field, in particular, the accuracy of fluid flow measurements and fluid management can be essential. There are many methods and devices for measuring fluid flow when the flow is a continuous flow; however in the non-continuous flow regime such as drops, lack of accurate measurement techniques is prominent.

Usually, volumetric drops flow or other non-continuous flow of fluids is measured using collecting means or optical counters (for drops). An example for an optical counter is disclosed in U.S. Pat. No. 4,314,484 "Self-Compensating Optical drop Count Apparatus for Measuring Volumetric Fluid Flow" by Bowman and filed in 1979. The patent discloses a self-compensating optical drop count apparatus for measuring volumetric fluid flow by optically counting the number of drops that pass through a drop chamber. Optical counting circuitry is designed to count each drop only once. Another counter is disclosed in U.S. Pat. No. 6,640,649 "Droplet Counter for Low Flow Rates" by Paz et al. This low flow metering device for measuring the flow of an amount of fluid exceeding 0.05 ml, in which a first chamber has an inlet and an outlet in fluid communication with a second chamber, the first chamber containing an element creating laminar flow. An electronic system is positioned in the second chamber below a drop generator for counting the passage of each droplet existing therefrom, and an information processing unit is connected to the electronic system for receiving and recording information.

These means as well as other means for fluid management bear inherent mass errors that accumulatively may generate massive mistakes in the result of the measurement. Such systems for fluid management in which non-continuous measurements are performed are used in many disciplines such as scientific fields or medical fields as mentioned herein above, in which mistakes may have serious and hazardous outcomes.

SUMMARY OF THE INVENTION

It is an object of the present invention to provide an apparatus and a method for accurately measuring the volumetric or mass fluid flow, especially when fluid flows in a non-continuous manner such as drops.

It is another object of the present invention to provide an apparatus and a method for reliably measuring the volumetric or mass fluid flow in medical and fluid management applications such as urine measuring devices, fluid infusion or blood transfusion devices.

It is yet another object of the present invention to provide an apparatus and method for measuring the volumetric or mass fluid flow without counting the drops so as to eliminate inherent errors generated from counting individual drops.

It is thus provided in accordance with an aspect of the present invention, an apparatus for measuring mass flow of fluid, said apparatus comprising:

a capsule having an upper opening and a bottom opening;

a housing having an upper end and a bottom end wherein said capsule is adapted to move upwardly and downwardly within said housing;

a force exerting means provided in a predetermined position, wherein said force exerting means is adapted to exert force on said capsule wherein said force is proportional to a position of said capsule within said housing;

a tube provided in said upper end of said housing wherein the fluid flows through said tube into said capsule;

a measuring means adapted to measure said force;

a controller adapted to control said force exerting means;

a seal is provided in said bottom opening wherein said seal is adapted to fluidically block said bottom opening;

an opening means is provided in said bottom end of said housing wherein said opening means is adapted to open said seal when said capsule is downwardly positioned;

whereby the position of the capsule within said housing depends upon the mass of accumulated fluid in the capsule and the force exerted on it, wherein as fluid is accumulated in said capsule, the capsule moves downwardly towards said bottom end where the fluid drains due to the seal that is opened by said opening means and whereby the amount of fluid that passes through the apparatus as well as its rate is measurable.

Furthermore, in accordance with another preferred embodiment of the present invention, when said capsule is filled with fluid and said measuring means measures a predetermined force that indicates a known mass of fluid in said capsule, said controller is adapted to temporarily allow said capsule to move downwardly so that fluid is drained through said bottom opening and the number of times the capsule is drained in a predetermined time frame can be calculated so as to attain the mass flow rate of the fluid.

Furthermore, in accordance with another preferred embodiment of the present invention, the fluid is dripping in drops from said tube into said capsule.

Furthermore, in accordance with another preferred embodiment of the present invention, the fluid flows in a continuous manner from said tube to said capsule.

Furthermore, in accordance with another preferred embodiment of the present invention, said upper end of said housing is provided with a filter adapted to filter the fluid accumulated in said capsule.

Furthermore, in accordance with another preferred embodiment of the present invention, said capsule is provided with means that force said seal onto said bottom opening.

Furthermore, in accordance with another preferred embodiment of the present invention, said means is a spring attached to the inner circumference of said capsule.

Furthermore, in accordance with another preferred embodiment of the present invention, said opening means is a pin that is adapted to push aside said seal when said capsule is downwardly positioned.

Furthermore, in accordance with another preferred embodiment of the present invention, the fluid flows through the housing in an overflow manner in case of blockage in the capsule.

Furthermore, in accordance with another preferred embodiment of the present invention, said force can be any force such as magnetic force, elastic force, electric force.

It is further provided in accordance with yet another preferred embodiment of the present invention, an apparatus for measuring volumetric flow of fluid comprising:

a capsule having an upper opening and a bottom opening;

a housing having an upper end and a bottom end wherein said capsule is adapted to move upwardly and downwardly within said housing;

a magnetic means provided relatively close to said upper end, wherein said magnetic means is adapted to exert magnetic force on said capsule wherein said force is proportional to a position of said capsule within said housing and said force is in a minimal state when said capsule is adjacent to said magnetic means;

a tube provided in said upper end of said housing wherein the fluid flows through said tube into said capsule;

a measuring means adapted to measure said magnetic force;

a controller adapted to control said magnetic means;

a seal is provided in said bottom opening wherein said seal is adapted to fluidically block said bottom opening;

a pin is provided in said bottom end of said housing wherein said pin is adapted to push aside said seal when said capsule is downwardly positioned;

whereby the position of the capsule within said housing depends upon the mass of accumulated fluid in the capsule wherein as fluid is accumulated in said capsule, the capsule moves downwardly towards said bottom end where the fluid drains due to the seal that is pushed aside by said opening means and whereby the amount of fluid that passes through the apparatus as well as its rate is measured.

Furthermore, in accordance with another preferred embodiment of the present invention, when said capsule is filled with fluid and said measuring means measures a predetermined magnetic force, which indicates a known volume of fluid in said capsule, said controller is adapted to temporarily disconnect said magnetic means so as to allow said capsule to move downwardly so that fluid is drained through said bottom opening and the number of times the capsule is drained in a predetermined time can be calculated so as to attain the volumetric flow rate of the fluid.

Furthermore, in accordance with another preferred embodiment of the present invention, said magnetic means is a DC coil and said measuring means is a differential transformer.

Furthermore, in accordance with another preferred embodiment of the present invention, said differential transformer comprises an AC input coil and an AC output coil.

Furthermore, in accordance with another preferred embodiment of the present invention, said DC coil and said differential transformer circumscribe said housing.

Furthermore, in accordance with another preferred embodiment of the present invention, said housing is provided with a second magnetic means, wherein said second magnetic means is positioned substantially adjacent to said bottom opening.

Furthermore, in accordance with another preferred embodiment of the present invention, the fluid is dripping in drops from said tube into said capsule.

Furthermore, in accordance with another preferred embodiment of the present invention, the fluid flows in a continuous manner from said tube to said capsule.

Furthermore, in accordance with another preferred embodiment of the present invention, said upper end of said housing is provided with a filter adapted to filter the fluid accumulated in said capsule.

Furthermore, in accordance with another preferred embodiment of the present invention, said capsule is provided with means that force said seal onto said bottom opening.

Furthermore, in accordance with another preferred embodiment of the present invention, said means is a spring attached to the inner circumference of said capsule.

Furthermore, in accordance with another preferred embodiment of the present invention, said controller is provided with a calibration standard of said capsule and wherein said calibration standard relates the position of said capsule to said magnetic force exerted onto said capsule.

Furthermore, in accordance with another preferred embodiment of the present invention, said controller is adapted to re-calibrate said calibration standard when an original position of said capsule is not attained.

It is in addition provided in accordance with another preferred embodiment of the present invention, a method for measuring the volumetric flow of fluid comprising:

providing a capsule having an upper opening and a bottom opening;

providing a housing having an upper end and a bottom end wherein said capsule is adapted to move upwardly and downwardly within said housing;

providing a magnetic means relatively close to said upper end, wherein said magnetic means is adapted to exert magnetic force on said capsule wherein said force is proportional to the position of said capsule within said housing and said force is in a minimal state when said capsule is adjacent to said magnetic means;

providing a tube in said upper end of said housing;

providing a measuring means adapted to measure said magnetic force;

providing a controller adapted to control said magnetic means;

providing a seal in said bottom opening wherein said seal is adapted to fluidically block said bottom opening;

providing a pin in said bottom end of said housing wherein said pin is adapted to push aside said seal when said capsule is downwardly positioned;

allowing the fluid to flow through said tube into said capsule;

disconnecting said magnetic means when said measuring means measure a predetermined magnetic force exerted on said capsule so as to allow the capsule to be drained;

connecting said magnetic means when said capsule is empty of fluid.

Whereby the volumetric flow rate can be calculated from the number of times said capsule is drained in a predetermined time.

Furthermore, in accordance with another preferred embodiment of the present invention, said method further comprises self-calibrating the force exerted onto said capsule.

In addition, in accordance with another preferred embodiment of the present invention, said method further comprising positioning a second magnetic means adjacent to said bottom end.

BRIEF DESCRIPTION OF THE FIGURES

In order to better understand the present invention and appreciate its practical applications, the following Figures are attached and references herein. Like components are denoted by like reference numerals.

It should be noted that the figures are given as examples and preferred embodiments only and in no way limit the scope of the present invention as defined in the appending Description and Claims.

DETAILED DESCRIPTION OF THE INVENTION

Figure 1:
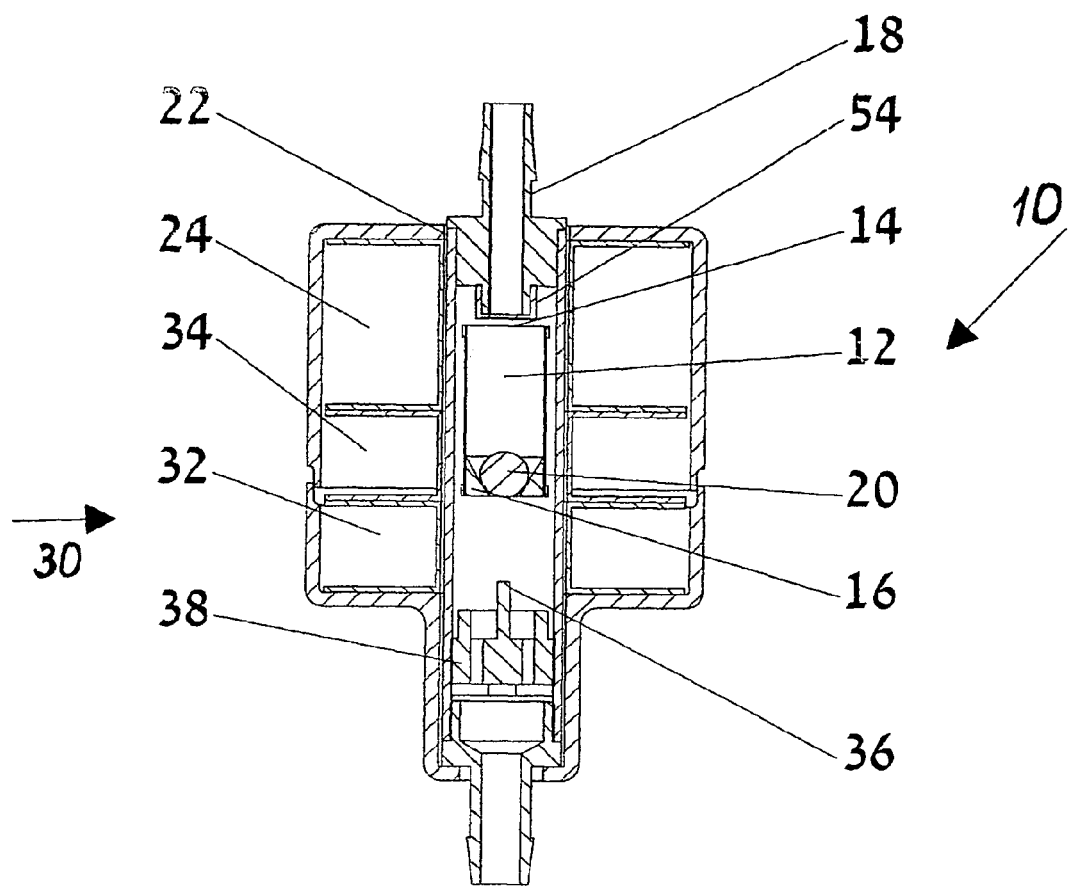
FIG. 1 illustrates a cross sectional view of an apparatus for measuring the mass flow of fluid drops in accordance with a preferred embodiment of the present invention.

In fluid management fields, especially where the flow rates are non-continuous and establish a regime of drops, it is customary to measure the volumetric or mass flow using optical counters of drops. Those methods bear inherent errors that are originated from the size and shape of the droplets. The present invention provides a unique and novel apparatus that accumulates the drops so that characteristics of the drops themselves that outcome from various physical characters has no effect on the measurement.

Since in apparatii used today especially in medical fields, the drops are counted individually, any movement or change in character of the fluid throughout the measurement may cause an enormous mistake. The outcome of such a mistake is crucial since drug management is decided according to the results of the measurement. However, similar errors in the scientific field have also severe outcomes.

The present invention provides a new and unique apparatus for measuring volumetric or mass flow of fluid. Throughout the following text, the use of the terms volumetric flow and mass flow are used arbitrarily. The transition from fluid volume to fluid mass and vice versa are simple and can be incorporated in the controller software in accordance with the fluid that is being managed. The apparatus comprises a capsule that moves upwardly and downwardly within a housing. Close to the housing, a force exerting means is provided, positioned relatively close to said upper end, wherein the force exerting means is adapted to exert force on the capsule. The force that is exerted can be any force such as an electric force, magnetic force, spring force, elastic force, aerodynamic force and so on. The exerted force is proportional to the position of the capsule within the housing and the force is in a minimal state when the capsule is adjacent to the force exerting means. In a preferable aspect of the present invention, the force exerting means is a magnetic means.

The apparatus is further provided with a tube that leads the fluid to flow into said capsule so that fluid accumulates within the capsule. A measuring means is adapted to measure the force and a controller is adapted to control the force exerting means. A seal is provided in the bottom of the capsule so as to fluidically block a bottom opening of the capsule. An opening means that is provided in the bottom end of the housing is adapted to open the seal when the capsule is downwardly positioned so that the capsule is drained in the downward position and retains its original weight.

When the capsule is filed with fluid and said measuring means measures a predetermined force, which indicates a known volume of fluid in said capsule, the controller is adapted to temporarily allow the capsule to move downwardly so that fluid is drained through the bottom opening of the capsule and the number of times the capsule is drained in a predetermined time can be calculated so as to attain the volumetric flow rate of the fluid.

Reference is now made to FIG. 1 illustrating a cross sectional view of an apparatus for measuring the volumetric flow of fluid drops in accordance with a preferred embodiment of the present invention. An apparatus for measuring a fluid volumetric flow 10 comprises a capsule 12 having an upper opening 14 and a bottom opening 16. The capsule acts as a plunger that floats in a housing as will be explained herein after, however, the capsule is in fact a passage in which fluid is adapted to alternately accumulate and drain. The term "capsule" will be used for the capsule shaped plunger in the following text. Capsule 12 is adapted to plunge beneath a tube 18 of which drops are dripping. Bottom opening 16 is kept closed by a ball 20, preferably made of rubber, that fluidically blocks opening 16. The drops (cannot be seen in FIG. 1) dripping of tube 18 are accumulated within capsule 12 that acts as a reservoir.

Optionally, another shaped blocker can be utilized in order to allow the drops to accumulate in the capsule. Other blockers are covered by the scope of the present invention.

In order to improve the sealing properties of ball 20 and to prevent leaks from capsule 12 when fluid is accumulated within the capsule, it is preferable to provide the ball with means that exert force onto it, wherein the force is downwardly directed so as to hold ball 20 onto bottom opening 16.

Figure 3:
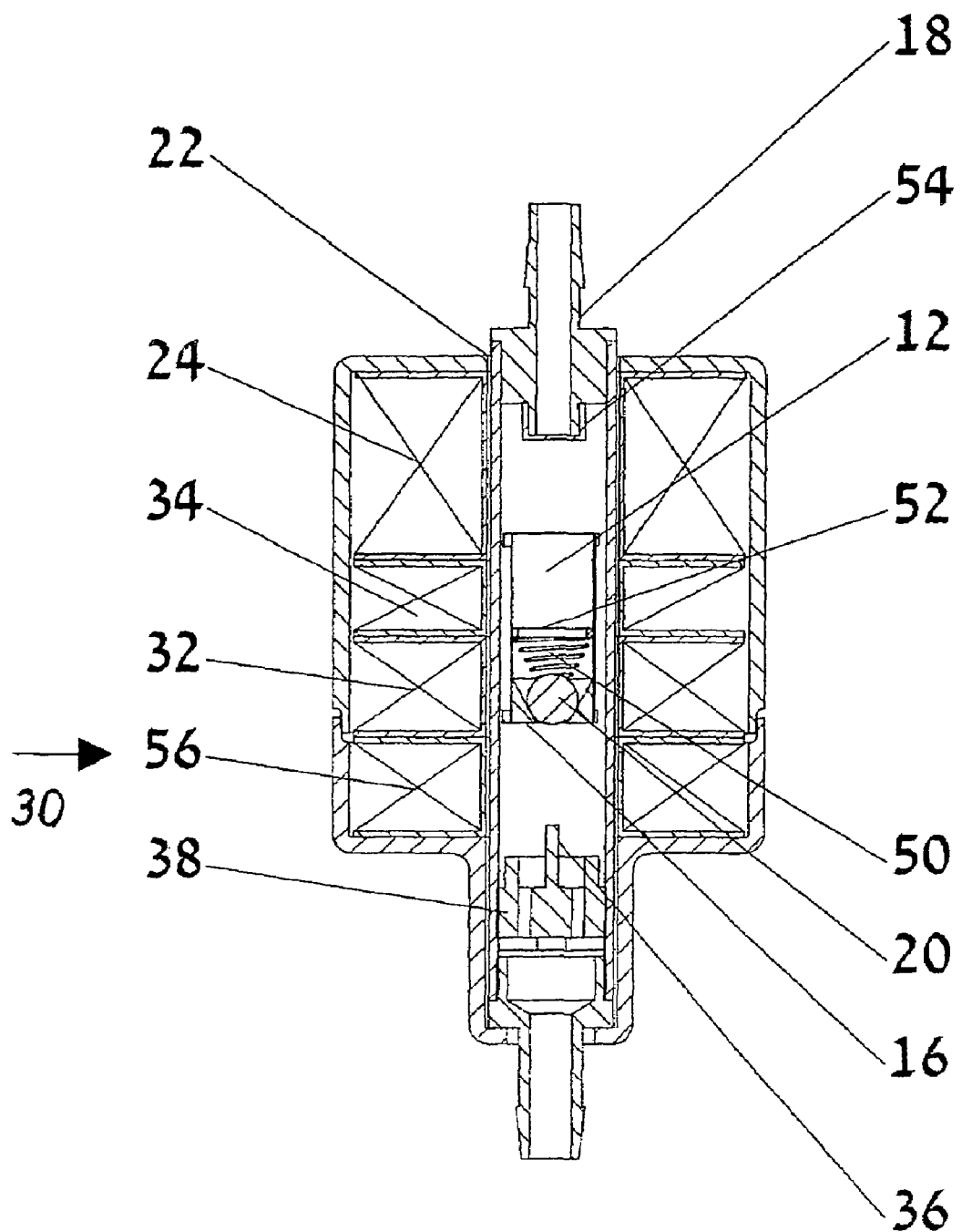
FIG. 3 illustrates a cross sectional view of an apparatus for measuring the mass flow of fluid drops in accordance with another preferred embodiment of the present invention.

Reference is now made to FIG. 3 illustrating a cross sectional view of an apparatus for measuring the mass flow of fluid drops in accordance with another preferred embodiment of the present invention. On top of ball 20, a spring 50 is provided which is attached to a ring 52 that is adhered to the circumference of capsule 12. Spring 50 pushes ball 20 downwardly and against bottom opening 16 so as to seal the bottom opening.

Optionally, it is preferable to provide housing 22 with a filter 54 that filters the fluid dripping or flowing into capsule 12 so that there will be no gross dirt that can obstruct the sealing of bottom opening 16. In this case, it also provides an opportunity to observe the existence of solids in the fluid and to send them to a laboratory check. This can provide additional indication of a medical condition in cases the apparatus is used in the medical field.

Returning to FIG. 1, as mentioned herein before, capsule 12 is a plunger; therefore, adapted to vertically move within a housing 22 having an upper end and a bottom end. Capsule 12 is adapted to move within housing 22 upwardly and downwardly. Capsule 12 is maintained in a predetermined position within housing 12, which is close to the upper end of the housing, by a force that can be generated by magnetic means, by resilient means, or any other means. In any case, the force by which the capsule is maintained in position has to be a measurable force. According to the embodiment disclosed herein, capsule 12 is maintained in position by a DC coil 24, such as a solenoid, generating a magnetic field about capsule 12. It is obvious that in this case, capsule 12 comprises elements having magnetic properties such as metallic elements so as to maintain an impact on DC coil 24. DC coil 24 circumscribes housing 22 close to the upper end of the housing. The use of coils as force exerting means provides the apparatus with better accuracy and sensitivity.

When capsule 12 is empty, a predetermined force is applied on it by the magnetic flux so as to maintain the capsule in position. As drops accumulate in capsule 12, the weight of the capsule; hence the force exerted by the capsule, becomes greater. The force exerted by DC coil 24 is responsive to the position of capsule 12 within housing 22.

A differential transformer 30 is provided circumscribing housing 22. Differential transformer 30 comprises two AC coils, an input coil 32 and an output coil 34. Input coil 32 receives an alternating current while the output that is measured by output coil 34 is influenced by the positioning of capsule 12 and the DC coil. In this way, differential transformer 30 is used in order to calibrate the positioning of capsule 12 that is proportional to the weight of the capsule and the fluid accumulating in it. As the weight of the capsule is becoming greater due to the accumulation of the fluid dripping into it, it moves downwardly. The positioning of the capsule is recorded by a processing means (not shown in the Figures) that receives the data from output coil 34 and can be interpreted into weight of fluid; hence volume of fluid. The ability to measure the rate in which capsule 12 is traveling downwardly can provide information such as the volumetric or mass rate of the drops or the flow of fluid from the tube and the specific gravity of the fluid, provided the volume is known.

According to the method of the present invention, at a predetermined value measured by output coil 34 that indicates capsule 12 is filled or substantially filled, DC coil 24 is disconnected so as to eliminate the magnetic field operating on capsule 12. In fact, the capsule can be disconnected from the magnetic force in any predetermined state of fluid filling.

Figure 2:
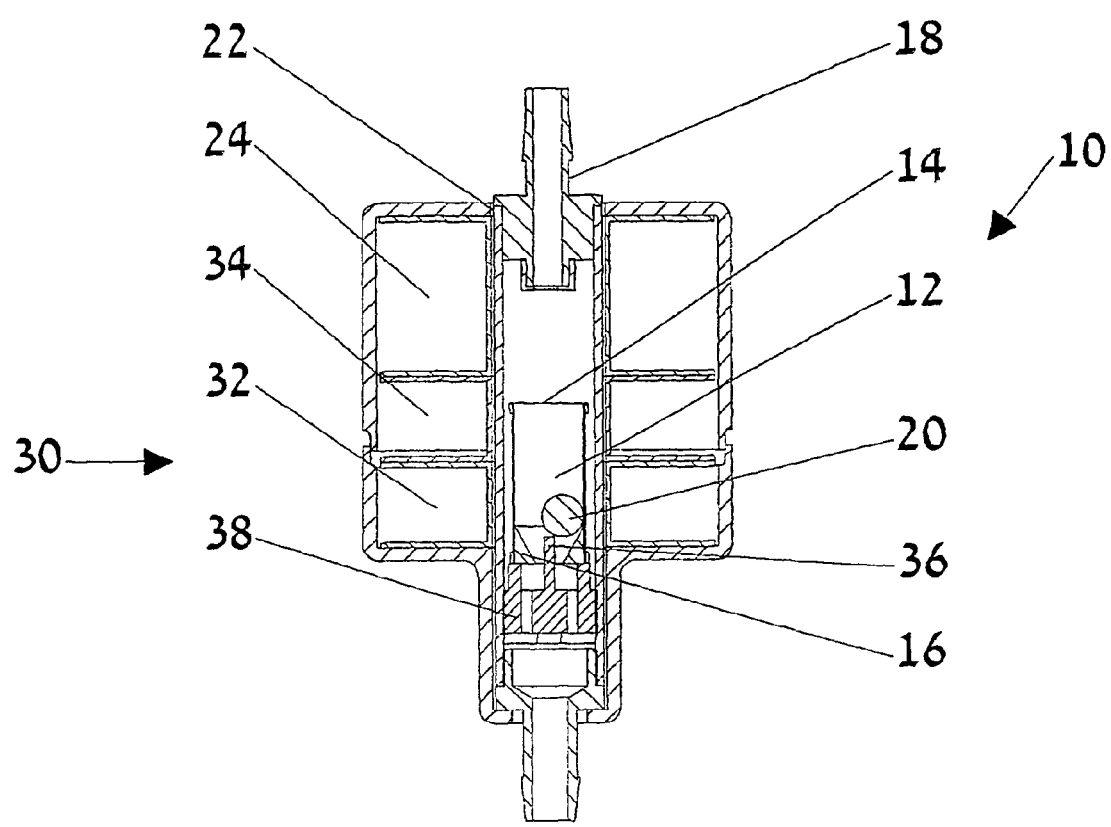
FIG. 2 illustrates a cross sectional view of the apparatus shown in FIG. 1, in draining state.

Reference is now made to FIG. 2 illustrating a cross sectional view of the apparatus shown in FIG. 1, in draining state. When DC coil 24 is disconnected, there is no force holding capsule 12 in the upward position and it falls down due to gravity to the bottom of housing 22. Bottom end of housing 22 is provided with a pin 36. When capsule 12 falls downwardly, pin 36 pass through bottom opening 16 and pushes ball 20 aside so as to allow fluid accumulated in capsule 12 to drain through a drain tube 38.

Immediately after the fluid in capsule 12 is drained, DC coil 24 is connected again, forcing capsule 12 to return to its original place adjacent to DC coil 24. Fluid dripping from tube 18 starts to accumulate again. The number of times capsule 12 falls down is proportional to the volume of fluid dripping or flowing through tube 12. Drain tube 38 can be connected to a fluid collecting bag (not shown in the Figures). Since the volume of fluid in capsule 12 is known and the time in which the capsule is being filled is also known, the rate of volumetric flow from tube 18 can be measured. The number of times capsule 12 is drained can be also measured so as to allow a continuous measure of the flow rate.

Reference is made again to FIG. 3 illustrating another preferred embodiment of the apparatus of the present invention. In order to assure the drainage of capsule 12 and to overcome the force exerted onto ball 20, which improve the sealing of the capsule, an additional DC coil 56 is provided adjacent or beneath the bottom end of housing 22. When DC coil 24 is disconnected, additional DC coil 56 is connected so as to force capsule 12 downwardly against pin 36. Additional DC coil facilitates in removing ball 20 from bottom opening 16 and overcoming the force of spring 50, which pushes ball 20 downwardly. After the drainage of the capsule is completed, additional DC coil 56 is disconnected and DC coil 24 is reconnected as explained herein before.

Due to the high accuracy of the apparatus of the present invention when used with DC and AC coils, the apparatus goes through a self-calibration process. If from some reason such as dirt adhered onto the capsule, the capsule is not returning to its original place when the DC coil is re-connected (change in its original weight), a self-calibration process is performed, in which the place the capsule is positioned when it is still empty is re-defined. Accordingly, the calibration of the DC Vs. positioning of the capsule, is re-calibrated. Alternatively, the DC coil self-calibration can be performed by measuring the current needed to force the plunged capsule to reach a predetermined position. It is possible to continuously or intermittently measure the current and compare the resulting values.

It should be noticed that flow can be measured by the apparatus of the present invention for fluids of all viscosities as well as for solids, especially in the form of powders. Powder can be also accumulated in the capsule and its mass of volumetric flow rate can be measured.

It should be mentioned that for safety reasons the fluid will flow through the housing without passing through the capsule in case there is a blockage in the capsule or the capsule from some reason is not functioning. In this case an overflow occurs.

It shown be noticed that the flow can be measured when the fluid flows in drops or in a continuous manner, and there is no limitation as for the flow rate. The fluid can be of any viscosity or density while in any case the flow rate can be measured by the apparatus and method of the present invention. The measurement is accurate if the flow regime is even markedly changed during measurements and there will be no impact of the rate on the accuracy of the measurement.

It should be clear that the description of the embodiments and attached Figures set forth in this specification serves only for a better understanding of the invention, without limiting its scope as covered by the following Claims.

It should also be clear that a person skilled in the art, after reading the present specification can make adjustments or amendments to the attached Figures and above described embodiments that would still be covered by the following Claims.

The invention claimed is:

1. An apparatus for measuring mass flow of fluid, said apparatus comprising:
   a capsule having an upper opening and a bottom opening;
   a housing having an upper end and a bottom end wherein said capsule is adapted to move upwardly and downwardly within said housing;
   a force exerting means provided in a predetermined position, wherein said force exerting means is adapted to exert force on said capsule wherein said force is proportional to a position of said capsule within said housing;
   a tube provided in said upper end of said housing wherein the fluid flows through said tube into said capsule;
   a measuring means adapted to measure said force;
   a controller adapted to control said force exerting means;
   a seal is provided in said bottom opening wherein said seal is adapted to fluidically block said bottom opening;
   an opening means is provided in said bottom end of said housing wherein said opening means is adapted to open said seal when said capsule is downwardly positioned;
   whereby the position of the capsule within said housing depends upon the mass of accumulated fluid in the capsule and the force exerted on it, wherein as fluid is accumulated in said capsule, the capsule moves downwardly towards said bottom end where the fluid drains due to the seal that is opened by said opening means and whereby the amount of fluid that passes through the apparatus as well as its rate is measurable.

2. The apparatus as claimed in claim 1, wherein when said capsule is filled with fluid and said measuring means measures a predetermined force that indicates a known mass of fluid in said capsule, said controller is adapted to temporarily allow said capsule to move downwardly so that fluid is drained through said bottom opening and the number of times the capsule is drained in a predetermined time frame can be calculated so as to attain the mass flow rate of the fluid.

3. The apparatus as claimed in claim 1, wherein the fluid is dripping in drops from said tube into said capsule.

4. The apparatus as claimed in claim 1, wherein the fluid flows in a continuous manner from said tube to said capsule.

5. The apparatus as claimed in claim 1, wherein said upper end of said housing is provided with a filter adapted to filter the fluid accumulated in said capsule.

6. The apparatus as claimed in claim 1, wherein said capsule is provided with means that force said seal onto said bottom opening.

7. The apparatus as claimed in claim 6, wherein said means that force said seal is a spring attached to the inner circumference of said capsule.

8. The apparatus as claimed in claim 1, wherein said opening means is a pin that is adapted to push aside said seal when said capsule is downwardly positioned.

9. The apparatus as claimed in claim 1, wherein the fluid flows through the housing in an overflow manner in case of blockage in the capsule.

10. The apparatus as claimed in claim 1, wherein said force can be any force such as magnetic force, elastic force, electric force.

11. An apparatus for measuring volumetric flow of fluid comprising:
a capsule having an upper opening and a bottom opening;
a housing having an upper end and a bottom end wherein said capsule is adapted to move upwardly and downwardly within said housing;
a magnetic means provided relatively close to said upper end, wherein said magnetic means is adapted to exert magnetic force on said capsule wherein said force is proportional to a position of said capsule within said housing and said force is in a minimal state when said capsule is adjacent to said magnetic means;
a tube provided in said upper end of said housing wherein the fluid flows through said tube into said capsule;
a measuring means adapted to measure said magnetic force;
a controller adapted to control said magnetic means;
a seal is provided in said bottom opening wherein said seal is adapted to fluidically block said bottom opening;
a pin is provided in said bottom end of said housing wherein said pin is adapted to push aside said seal when said capsule is downwardly positioned;
whereby the position of the capsule within said housing depends upon the mass of accumulated fluid in the capsule wherein as fluid is accumulated in said capsule, the capsule moves downwardly towards said bottom end where the fluid drains due to the seal that is pushed aside by said opening means and whereby the amount of fluid that passes through the apparatus as well as its rate is measured.

12. The apparatus as claimed in claim 11, wherein when said capsule is filled with fluid and said measuring means measures a predetermined magnetic force, which indicates a known volume of fluid in said capsule, said controller is adapted to temporarily disconnect said magnetic means so as to allow said capsule to move downwardly so that fluid is drained through said bottom opening and the number of times the capsule is drained in a predetermined time can be calculated so as to attain the volumetric flow rate of the fluid.

13. The apparatus as claimed in claim 12, wherein said differential transformer comprises an AC input coil and an AC output coil.

14. The apparatus as claimed in claim 12, wherein said DC coil and said differential transformer circumscribe said housing.

15. The apparatus as claimed in claim 12, wherein said housing is provided with a second magnetic means, wherein said second magnetic means is positioned substantially adjacent to said bottom opening.

16. The apparatus as claimed in claim 11, wherein said magnetic means is a DC coil and said measuring means is a differential transformer.

17. The apparatus as claimed in claim 11, wherein the fluid is dripping in drops from said tube into said capsule.

18. The apparatus as claimed in claim 11, wherein the fluid flows in a continuous manner from said tube to said capsule.

19. The apparatus as claimed in claim 11, wherein said upper end of said housing is provided with a filter adapted to filter the fluid accumulated in said capsule.

20. The apparatus as claimed in claim 11, wherein said capsule is provided with means that force said seal onto said bottom opening.

21. The apparatus as claimed in claim 20, wherein said means that force said seal is a spring attached to the inner circumference of said capsule.

22. The apparatus as claimed in claim 11, wherein said controller is provided with a calibration standard of said capsule and wherein said calibration standard relates the position of said capsule to said magnetic force exerted onto said capsule.

23. The apparatus as claimed in claim 22, wherein said controller is adapted to re-calibrate said calibration standard when an original position of sid capsule is not attained.

24. A method for measuring the volumetric flow of fluid comprising:
providing a capsule having an upper opening and a bottom opening;
providing a housing having an upper end and a bottom end wherein said capsule is adapted to move upwardly and downwardly within said housing;
providing a magnetic means relatively close to said upper end, wherein said magnetic means is adapted to exert magnetic force on said capsule wherein said force is proportional to the position of said capsule within said housing and said force is in a minimal state when said capsule is adjacent to said magnetic means;
providing a tube in said upper end of said housing;
providing a measuring means adapted to measure said magnetic force;
providing a controller adapted to control said magnetic means;
providing a seal in said bottom opening wherein said seal is adapted to fluidically block said bottom opening;
providing a pin in said bottom end of said housing wherein said pin is adapted to push aside said seal when said capsule is downwardly positioned;
allowing the fluid to flow through said tube into said capsule;
disconnecting said magnetic means when said measuring means measure a predetermined magnetic force exerted on said capsule so as to allow the capsule to be drained;
connecting said magnetic means when said capsule is empty of fluid,
whereby the volumetric flow rate can be calculated from the number of times said capsule is drained in a predetermined time.

25. The method as claimed in claim 24, wherein said method further comprises self-calibrating the force exerted onto said capsule.

26. The method as claimed in claim 24, wherein said method further comprising positioning a second magnetic means adjacent to said bottom end.

* * * * *